US008917094B2

(12) United States Patent
Bittar et al.

(10) Patent No.: US 8,917,094 B2
(45) Date of Patent: Dec. 23, 2014

(54) METHOD AND APPARATUS FOR DETECTING DEEP CONDUCTIVE PIPE

(75) Inventors: Michael S. Bittar, Houston, TX (US); Jing Li, Pearland, TX (US)

(73) Assignee: Halliburton Energy Services, Inc., Houston, TX (US)

(*) Notice: Subject to any disclaimer, the term of this patent is extended or adjusted under 35 U.S.C. 154(b) by 487 days.

(21) Appl. No.: 13/106,032

(22) Filed: May 12, 2011

(65) Prior Publication Data
US 2011/0309836 A1 Dec. 22, 2011

Related U.S. Application Data

(60) Provisional application No. 61/357,311, filed on Jun. 22, 2010.

(51) Int. Cl.
*G01V 3/10* (2006.01)
*G01V 3/18* (2006.01)
*G01V 3/26* (2006.01)

(52) U.S. Cl.
CPC ... *G01V 3/26* (2013.01); *G01V 3/10* (2013.01); *G01V 3/18* (2013.01)
USPC ........... 324/339; 324/338; 324/337; 324/345; 324/346; 324/331; 324/332; 324/333; 324/334; 324/335; 324/336; 324/347; 324/348; 324/349; 702/6; 702/7; 702/11; 702/13; 175/50; 175/45; 175/40; 175/61; 175/76; 166/250.01; 166/66; 166/66.5; 166/254.2; 166/245; 166/248; 166/252.2

(58) Field of Classification Search
CPC ............. G01V 9/00; G01V 3/38; E21B 41/00
USPC ......... 324/345, 346, 347, 348, 349, 331–337, 324/338–339; 702/6, 7, 11, 13; 175/50, 45, 175/40, 61, 73, 74, 76; 166/250.01, 66, 166/66.5, 254.2, 245, 248, 252.2
See application file for complete search history.

(56) References Cited

U.S. PATENT DOCUMENTS 3,406,766 A 10/1968 Henderson
3,614,600 A * 10/1971 Ronka ........................... 324/330

(Continued)

FOREIGN PATENT DOCUMENTS

AU 2011202215 5/2013
EP 1315984 1/2011

(Continued)

OTHER PUBLICATIONS

Bittar, Michael S., et al., "Invasion Profiling with a Multiple Depth of Investigation, Electromagnetic Wave Resistivity Sensor", SPE 28425, 69th Annual Technical Conference and Exhibition of the SPE, New Orleans, LA, (Sep. 25, 1994), pp. 1-12, plus 11 pgs of Figures.

(Continued)

*Primary Examiner* — Patrick Assouad
*Assistant Examiner* — Lamarr Brown
(74) *Attorney, Agent, or Firm* — Krueger Iselin LLP; Alan Bryson

(57) ABSTRACT

Downhole tools and techniques acquire information regarding nearby conductors such as pipes, well casing, and conductive formations. At least some method embodiments provide a current flow along a drill string in a borehole. The current flow disperses into the surrounding formation and causes a secondary current flow in the nearby conductor. The magnetic field from the secondary current flow can be detected using one or more azimuthally-sensitive antennas. Direction and distance estimates may be obtainable from the azimuthally-sensitive measurements, and can be used as the basis for steering the drillstring relative to the distant conductor. Possible techniques for providing current flow in the drillstring include imposing a voltage across an insulated gap or using a toroid around the drillstring to induce the current flow.

18 Claims, 4 Drawing Sheets

(56) References Cited

U.S. PATENT DOCUMENTS

| | | | |
|---|---|---|---|
| 4,072,200 A | 2/1978 | Morris et al. | |
| 4,224,989 A | 9/1980 | Blount | |
| 4,443,762 A | 4/1984 | Kuckes | |
| 4,458,767 A | 7/1984 | Hoehn, Jr. | |
| 4,472,684 A * | 9/1984 | Schuster | 324/339 |
| 4,502,010 A | 2/1985 | Kuckes | |
| 4,593,770 A | 6/1986 | Hoehn, Jr. | |
| 4,605,268 A * | 8/1986 | Meador | 439/194 |
| 4,780,678 A * | 10/1988 | Kleinberg et al. | 324/338 |
| 4,791,373 A | 12/1988 | Kuckes | |
| 4,845,434 A * | 7/1989 | Kuckes et al. | 324/346 |
| 4,933,640 A * | 6/1990 | Kuckes | 324/339 |
| 5,064,006 A * | 11/1991 | Waters et al. | 175/45 |
| 5,138,313 A | 8/1992 | Barrington | |
| 5,200,705 A * | 4/1993 | Clark et al. | 324/338 |
| 5,230,387 A * | 7/1993 | Waters et al. | 175/45 |
| 5,339,036 A | 8/1994 | Clark et al. | |
| 5,343,152 A | 8/1994 | Kuckes | |
| 5,358,050 A | 10/1994 | Schmidt | |
| 5,389,881 A | 2/1995 | Bittar et al. | |
| 5,541,517 A | 7/1996 | Hartmann et al. | |
| 5,676,212 A | 10/1997 | Kuckes | |
| 5,720,355 A | 2/1998 | Lamine et al. | |
| 6,098,727 A | 8/2000 | Ringgenberg et al. | |
| 6,163,155 A | 12/2000 | Bittar | |
| 6,191,586 B1 | 2/2001 | Bittar | |
| 6,218,842 B1 | 4/2001 | Bittar | |
| 6,246,240 B1 * | 6/2001 | Vail, III | 324/368 |
| 6,257,334 B1 | 7/2001 | Cyr | |
| 6,353,321 B1 | 3/2002 | Bittar | |
| 6,359,438 B1 | 3/2002 | Bittar | |
| 6,405,136 B1 | 6/2002 | Li et al. | |
| 6,476,609 B1 | 11/2002 | Bittar | |
| 6,538,447 B2 | 3/2003 | Bittar | |
| 6,810,331 B2 | 10/2004 | Bittar et al. | |
| 6,885,943 B2 | 4/2005 | Bittar et al. | |
| 6,911,824 B2 | 6/2005 | Bittar | |
| 6,944,546 B2 | 9/2005 | Xiao et al. | |
| 6,985,814 B2 | 1/2006 | McElhinney | |
| 7,019,528 B2 | 3/2006 | Bittar | |
| 7,038,455 B2 | 5/2006 | Beste et al. | |
| 7,046,010 B2 | 5/2006 | Hu et al. | |
| 7,098,664 B2 | 8/2006 | Bittar et al. | |
| 7,098,858 B2 | 8/2006 | Bittar et al. | |
| 7,133,779 B2 | 11/2006 | Tilke et al. | |
| 7,138,803 B2 | 11/2006 | Bittar | |
| 7,171,310 B2 | 1/2007 | Haugland | |
| 7,227,363 B2 | 6/2007 | Gianzero et al. | |
| 7,265,552 B2 | 9/2007 | Bittar | |
| 7,268,019 B2 | 9/2007 | Golla et al. | |
| 7,301,223 B2 | 11/2007 | Rodney et al. | |
| 7,345,487 B2 | 3/2008 | Bittar et al. | |
| 7,427,863 B2 | 9/2008 | Bittar | |
| 7,557,579 B2 | 7/2009 | Bittar | |
| 7,557,580 B2 | 7/2009 | Bittar | |
| 7,659,722 B2 | 2/2010 | Bittar | |
| 7,746,078 B2 | 6/2010 | Bittar et al. | |
| 7,812,610 B2 | 10/2010 | Clark et al. | |
| 7,825,664 B2 | 11/2010 | Homan et al. | |
| 7,839,148 B2 | 11/2010 | Vehra et al. | |
| 7,839,346 B2 | 11/2010 | Bittar et al. | |
| 7,948,238 B2 | 5/2011 | Bittar | |
| 7,982,464 B2 | 7/2011 | Bittar et al. | |
| 8,016,053 B2 | 9/2011 | Menezes et al. | |
| 8,030,937 B2 | 10/2011 | Hu et al. | |
| 8,085,049 B2 | 12/2011 | Bittar et al. | |
| 8,085,050 B2 | 12/2011 | Bittar et al. | |
| 8,120,361 B2 * | 2/2012 | Sinclair et al. | 324/338 |
| 8,159,227 B2 * | 4/2012 | Wang | 324/338 |
| 8,347,985 B2 | 1/2013 | Bittar et al. | |
| 8,499,830 B2 | 8/2013 | Alberty | |
| 2002/0005298 A1 * | 1/2002 | Estes et al. | 175/45 |
| 2002/0105333 A1 * | 8/2002 | Amini | 324/338 |
| 2003/0137301 A1 * | 7/2003 | Thompson et al. | 324/338 |
| 2004/0019427 A1 | 1/2004 | San Martin et al. | |
| 2005/0024060 A1 | 2/2005 | Bittar | |
| 2006/0022887 A1 | 2/2006 | Bittar | |
| 2006/0054354 A1 * | 3/2006 | Orban | 175/40 |
| 2007/0075455 A1 | 7/2006 | Bittar | |
| 2006/0244455 A1 | 11/2006 | Bittar | |
| 2006/0255811 A1 | 11/2006 | Bittar et al. | |
| 2007/0075874 A1 * | 4/2007 | Shah et al. | 340/853.7 |
| 2007/0126426 A1 | 6/2007 | Clark et al. | |
| 2007/0235225 A1 | 10/2007 | Bittar | |
| 2007/0247330 A1 * | 10/2007 | Clark | 340/854.6 |
| 2008/0078580 A1 * | 4/2008 | Bittar | 175/41 |
| 2008/0079431 A1 * | 4/2008 | Dashevsky et al. | 324/334 |
| 2008/0315884 A1 | 12/2008 | Bittar et al. | |
| 2009/0015260 A1 | 1/2009 | Bittar | |
| 2009/0138202 A1 * | 5/2009 | Tang et al. | 702/7 |
| 2009/0224764 A1 | 9/2009 | Bittar | |
| 2009/0229826 A1 | 9/2009 | East, Jr. et al. | |
| 2009/0230968 A1 | 9/2009 | Bittar et al. | |
| 2009/0272578 A1 * | 11/2009 | MacDonald | 175/26 |
| 2009/0302851 A1 | 12/2009 | Bittar et al. | |
| 2009/0309600 A1 | 12/2009 | Seydoux et al. | |
| 2009/0309798 A1 | 12/2009 | Bittar et al. | |
| 2010/0004866 A1 | 1/2010 | Rabinovich et al. | |
| 2010/0117855 A1 * | 5/2010 | Sinclair et al. | 340/854.6 |
| 2010/0155138 A1 * | 6/2010 | Kuckes | 175/45 |
| 2010/0155139 A1 * | 6/2010 | Kuckes | 175/45 |
| 2011/0006773 A1 | 1/2011 | Bittar | |
| 2011/0175899 A1 | 7/2011 | Bittar et al. | |
| 2011/0186290 A1 | 8/2011 | Roddy et al. | |
| 2011/0187556 A1 | 8/2011 | Roddy et al. | |
| 2011/0192592 A1 | 8/2011 | Roddy et al. | |
| 2011/0199228 A1 | 8/2011 | Roddy et al. | |
| 2011/0221443 A1 | 9/2011 | Bittar et al. | |
| 2011/0298461 A1 | 12/2011 | Bittar et al. | |
| 2011/0308859 A1 * | 12/2011 | Bittar et al. | 175/45 |
| 2011/0309833 A1 | 12/2011 | Yang | |
| 2011/0309836 A1 | 12/2011 | Bittar et al. | |
| 2012/0001637 A1 | 1/2012 | Bittar et al. | |
| 2012/0013339 A1 * | 1/2012 | Kuckes | 324/346 |
| 2012/0024600 A1 | 2/2012 | Bittar et al. | |
| 2012/0025834 A1 | 2/2012 | Minerbo et al. | |
| 2012/0133367 A1 | 5/2012 | Bittar et al. | |
| 2012/0212229 A1 * | 8/2012 | Sinclair et al. | 324/345 |
| 2013/0056272 A1 * | 3/2013 | Kuckes | 175/45 |
| 2013/0105224 A1 | 5/2013 | Donderici et al. | |

FOREIGN PATENT DOCUMENTS

| | | |
|---|---|---|
| EP | 1155343 | 3/2011 |
| GB | 2441033 | 2/2008 |
| WO | WO-2007/149106 | 12/2007 |
| WO | WO-2008/008386 | 1/2008 |
| WO | WO-2008/021868 | 2/2008 |
| WO | WO-2008/036077 | 3/2008 |
| WO | WO-2008/076130 | 6/2008 |
| WO | WO-2009/014882 | 1/2009 |
| WO | WO-2009/091408 | 7/2009 |
| WO | WO2009131584 | * 10/2009 |
| WO | WO-2010/005902 | 1/2010 |
| WO | WO-2010/005907 | 1/2010 |
| WO | WO-2010/006302 | 1/2010 |
| WO | WO-2010/075237 | 7/2010 |
| WO | WO-2011/049828 | 4/2011 |
| WO | WO-2011/129828 | 10/2011 |
| WO | WO-2012/005737 | 1/2012 |
| WO | WO-2012/008965 | 1/2012 |
| WO | WO-2012/064342 | 5/2012 |
| WO | WO-2012/121697 | 9/2012 |

OTHER PUBLICATIONS

Bittar, Michael S., "Resistivity Logging with Reduced Dip Artifacts", PCT Appl No. US2007/075455, filed Aug. 8, 2006.
Bittar, Michael S., et al., "Int'l Search Report and Written Opinion", dated Oct. 8, 2009, Appl No. PCT/US09/053354, "A High Frequency Dielectric Measurement Tool", filed Aug. 11, 2009, 11 pgs.
Bittar, Michael S., et al., "Antenna Coupling Component Measurement Tool Having a Rotating Antenna Configuration", PCT Appl No. US06/062149, filed Dec. 15, 2006.

(56) References Cited

OTHER PUBLICATIONS

Bittar, Michael S., et al., "A 3D Borehole Imager and a Dielectric Measurement Tool", PCT Appl No. US09/65537, filed Nov. 23, 2009.
Bittar, Michael S., et al., "Method and Apparatus with High Resolution Electrode Configuration for Imaging in Oil-Based Muds", U.S. Appl. No. 12/680,868, filed Mar. 30, 2010.
Bittar, Michael S., et al., "Systems and Methods for Displaying Logging Data", U.S. Appl. No. 12/295,158, filed Sep. 29, 2008.
Bittar, Michael S., et al., "Multimodal Geosteering Systems and Methods", U.S. Appl. No. 12/679,502, filed Mar. 23, 2010.
Bittar, Michael S., et al., "EM-Guided Drilling Relative to an Existing Borehole", U.S. Appl. No. 12/526,552, filed Aug. 10, 2009.
Bittar, Michael S., et al., "Robust Inversion Systems and Methods for Azimuthally Sensitive Resistivity Logging Tools", U.S. Appl. No. 12/299,760, filed Nov. 5, 2008.
Bittar, Michael S., et al., "Look-Ahead Boundary Detection and Distance Measurement", U.S. Appl. No. 12/067,582, filed Mar. 20, 2008.
Bittar, Michael S., et al., "Robust Inversion Systems and Methods for Azimuthally Sensitive Resistivity Logging Tools", U.S. Appl. No. 12/229,760, filed Nov. 5, 2008.
Bittar, Michael S., et al., "Systems and Methods Having Radially Offset Antennas for Electromagnetic Resistivity Logging", U.S. Appl. No. 12/300,876, filed Nov. 14, 2008.
Bittar, Michael S., et al., "Modular Geosteering Tool Assembly", U.S. Appl. No. 12/306,267, filed Dec. 23, 2008.
Bittar, Michael S., et al., "Method and Apparatus for Building a Tilted Antenna", U.S. Appl. No. 12/306,954, filed Dec. 30, 2008.
Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 09/238,832, filed Jan. 28, 1999.
Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 12/127,634, filed May 28, 2008.
Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 12/467,427, filed May 18, 2009.
Bittar, Michael S., "Electromagnetic Wave Resistivity Tool Having a Tilted Antenna for Geosteering Within a Desired Payzone", U.S. Appl. No. 09/615,501, filed Jul. 13, 2000.
Bittar, Michael S., "Electromagnetic Wave Resistivity Tool Having a Tilted Antenna for Geosteering Within a Desired Payzone", U.S. Appl. No. 10/255,048, filed Sep. 25, 2002.
Bittar, Michael S., "Electromagnetic Wave Resistivity Tool Having a Tilted Antenna for Geosteering Within a Desired Payzone", U.S. Appl. No. 10/616,429, filed Jul. 9, 2003.
Bittar, Michael S., "Electromagnetic Wave Resistivity Tool Having a Tilted Antenna for Geosteering Within a Desired Payzone", U.S. Appl. No. 11/198,068, filed Aug. 5, 2005.
Bittar, Michael S., "Electromagnetic Wave Resistivity Tool Having a Tilted Antenna for Geosteering Within a Desired Payzone", U.S. Appl. No. 11/457,709, filed Jul. 14, 2006.
Bittar, Michael S., "Electromagnetic Wave Resistivity Tool Having a Tilted Antenna for Geosteering Within a Desired Payzone", U.S. Appl. No. 11/745,822, filed May 8, 2007.
Bittar, Michael S., "Electromagnetic Wave Resistivity Tool Having a Tilted Antenna for Geosteering Within a Desired Payzone", U.S. Appl. No. 12/127,672, filed May 27, 2008.
Bittar, Michael S., "Electromagnetic Wave Resistivity Tool Having a Tilted Antenna for Geosteering Within a Desired Payzone", U.S. Appl. No. 12/467,434, filed May 18, 2009.
Bittar, Michael S., et al., "Method and Apparatus Having Antennas Configured to Measure Electrical Anisotropy", U.S. Appl. No. 12/088,061, filed Mar. 25, 2008.
Bittar, Michael S., et al., "Antenna Coupling Component Measurement Tool Having a Rotating Antenna Configuration", U.S. Appl. No. 12/294,557, filed Sep. 25, 2008.
UK Combined Search and Examination Report, dated Jul. 18, 2011, Appl No. GB1109125.3, "Method and Apparatus for Detecting Deep Conductive Pipe", filed May 27, 2011, 7 pgs.
UK Combined Search and Examination Report, dated Sep. 16, 2011, Application No. 1109401.8, "Real Time Determination of Casing Location and Distance with Tilted Antenna Measurement", filed Jun. 3, 2011, 5 pgs.
PCT International Search Report and Written Opinion, dated Dec. 15, 2011, Appl No. PCT/US2011/048317, "Improved Casing Detection Tools and Methods" filed Aug. 18, 2011, 8 pgs.
AU First Examination Report, dated Jan. 30, 2012, Appl No. 2011202215, "Method and Apparatus for Detecting Deep Conductive Pipe", filed May 13, 2011, 2 pgs.
AU First Examiner Report, dated Mar. 7, 2012, Appl No. 2011202518, "Real Time Determination of Casing Location and Distance with Tilted Antenna Measurement", filed May 30, 2011, 2 pgs.
PCT Application, dated Jun. 25, 2012, Appl No. PCT/US2012/043943, "Tilted Antenna Logging Systems and Methods Yielding Robust Measurement Signals", filed Jun. 25, 2012, 30 pgs.
PCT Application, dated Jun. 25, 2012, Appl No. PCT/US2012/043937, "Resistivity Logging Systems and Methods Employing Ratio Signal Set for Inversion", filed Jun. 25, 2012, 27 pgs.
UK Office Action, dated Jul. 19, 2012, Appl No. GB1109125.3, "Method and Apparatus for Detecting Deep Conductive Pipe", filed May 27, 2011, 2pgs.
Non-Final Office Action, dated Jul. 31, 2013, U.S. Appl. No. 13/175,514 , "Correcting for Magnetic Interference in Azimuthal Tool Measurements", filed Jul. 1, 2011, 15 pgs.
US Non-Final Office Action, dated Oct. 8, 2013, U.S. Appl. No. 13/116,069, "System and Method for EM Ranging in Oil-Based Mud", filed May 26, 2011, 12 pgs.
US Final Office Action, dated Apr. 18, 2014, U.S. Appl. No. 13/116,069, "System and Method for EM Ranging in Oil-Based Mud," filed May 26, 2011, 8 pgs.
US Final Office Action, dated May 8, 2014, U.S. Appl. No. 13/175,514, "Correcting for Magnetic Interference in Azimuthal Tool Measurements", filed Jul. 1, 2011, 15 pgs.

* cited by examiner

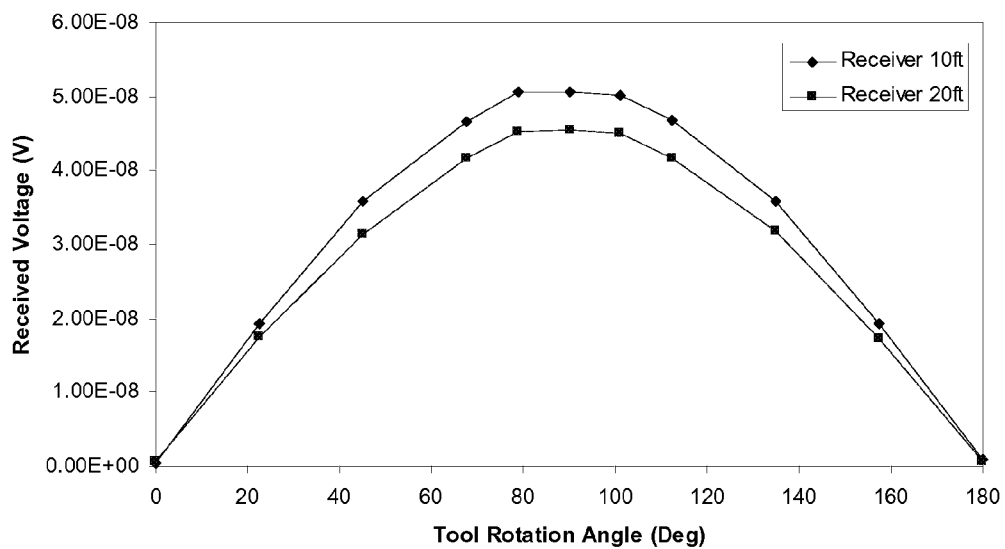
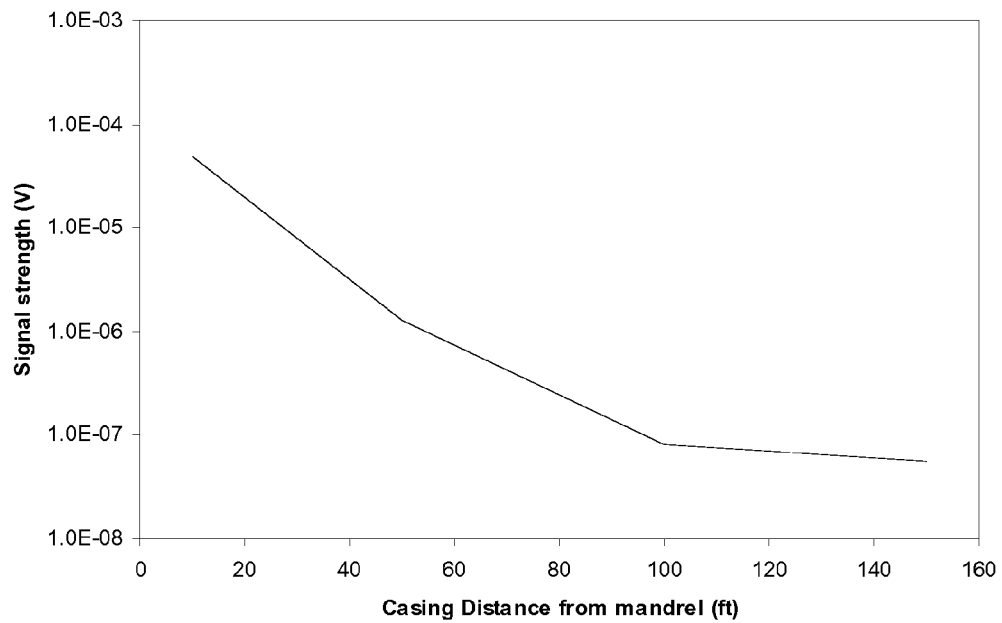

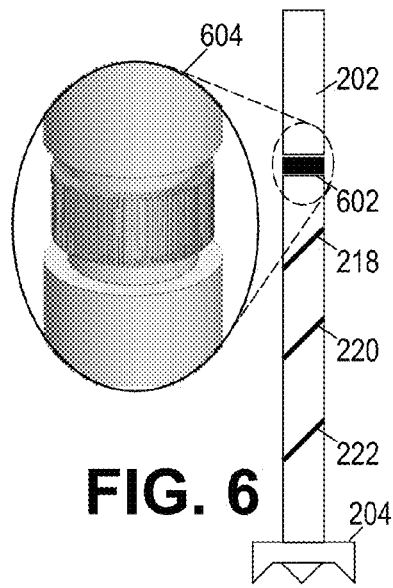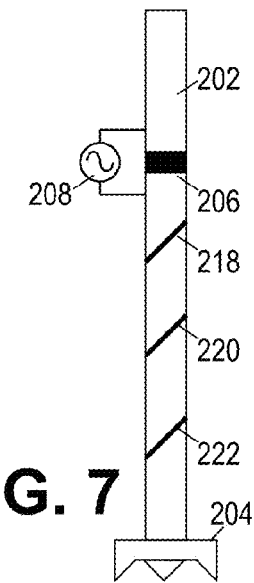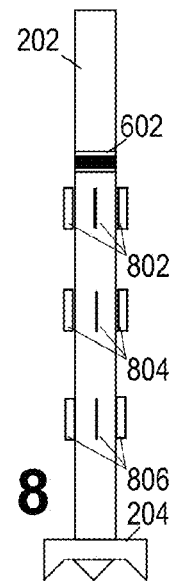
FIG. 6  FIG. 7  FIG. 8
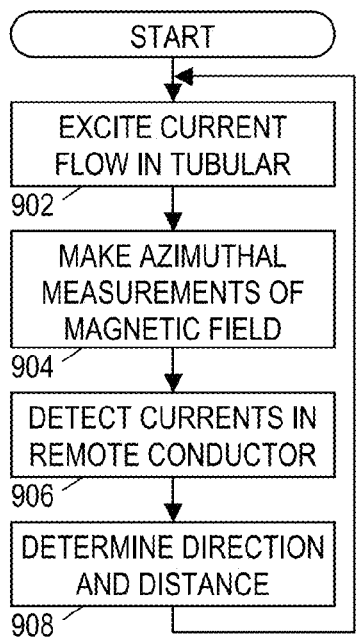
FIG. 9

METHOD AND APPARATUS FOR DETECTING DEEP CONDUCTIVE PIPE

CROSS-REFERENCE TO RELATED APPLICATIONS

This application claims priority to Provisional U.S. Application 61/357,311, titled "Method and Apparatus for Detecting Deep Conductive Pipe" and filed Jun. 22, 2010 by Bittar and Li, which is hereby incorporated herein by reference.

BACKGROUND

The world depends on hydrocarbons to solve many of its energy needs. Consequently, oil field operators strive to produce and sell hydrocarbons as efficiently as possible. Much of the easily obtainable oil has already been produced, so new techniques are being developed to extract less accessible hydrocarbons. These techniques often involve drilling a borehole in close proximity to one or more existing wells. One such technique is steam-assisted gravity drainage ("SAGD") as described in U.S. Pat. No. 6,257,334, "Steam-Assisted Gravity Drainage Heavy Oil Recovery Process". SAGD uses a pair of vertically-spaced, horizontal wells less than 10 meters apart, and careful control of the spacing is important to the technique's effectiveness. Other examples of directed drilling near an existing well include intersection for blowout control, multiple wells drilled from an offshore platform, and closely spaced wells for geothermal energy recovery.

One way to direct a borehole in close proximity to an existing well is "active ranging" in which an electromagnetic source is located in the existing well and monitored via sensors on the drillstring. By contrast systems that locate both the source and the sensors on the drillstring are often termed "passive ranging". Passive ranging may be preferred to active ranging because it does not require that operations on the existing well be interrupted. Existing passive ranging techniques rely on magnetic "hot spots" in the casing of the existing well, which limits the use of these techniques to identify areas where there is a significant and abrupt change in the diameter of casing or where the casing has taken on an anomalous magnetic moment, either by pre-polarization of the casing before it is inserted into the wellbore, or as a random event. See, e.g., U.S. Pat. No. 5,541,517 "A Method for drilling a borehole from one cased borehole to another cased borehole." In order to carry out such a polarization without interrupting production, it has been regarded as necessary to polarize the casing at some point in the construction of the well. This approach cannot be applied to wells that are already in commercial service without interrupting that service.

BRIEF DESCRIPTION OF THE DRAWINGS

A better understanding of the various disclosed embodiments can be obtained when the following detailed description is considered in conjunction with the accompanying drawings, in which:

FIG. 4 shows receiver voltage as a function of position and orientation;

FIG. 5 shows receiver voltage as a function of target distance;

FIGS. 6-8 show alternative tool configurations; and

FIG. 9 is a flow diagram of an illustrative ranging method.

Figure 1:
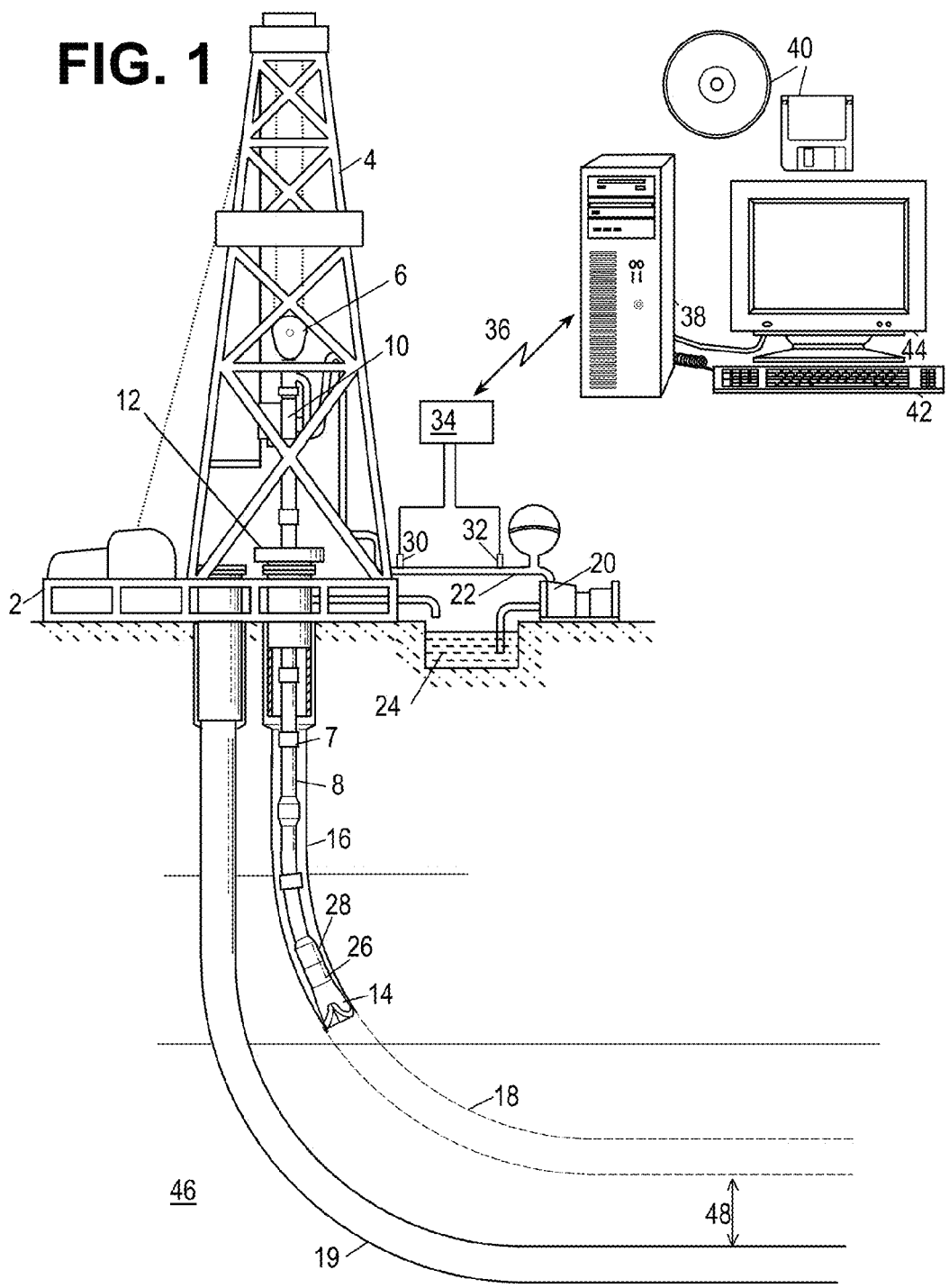
FIG. 1 shows an illustrative drilling environment in which electromagnetically-guided drilling may be employed.

While the invention is susceptible to various modifications and alternative forms, specific embodiments thereof are shown by way of example in the drawings and will herein be described in detail. It should be understood, however, that the drawings and detailed description are not intended to limit the disclosure to these particular embodiments, but on the contrary, the intention is to cover all modifications, equivalents and alternatives falling within the scope of the appended claims.

DETAILED DESCRIPTION

The issues identified in the background are at least partly addressed by disclosed methods and apparatus for detecting nearby conductors such as pipes, well casing, and conductive formations. At least some method embodiments provide a current flow along a conductive tubular in a borehole such as a drillstring. The current flow disperses into the surrounding formation and causes a secondary current flow in the nearby conductor. The magnetic field from the secondary current flow can be detected using one or more azimuthally-sensitive antennas. Direction and distance estimates may be obtainable from the azimuthally-sensitive measurements, and can be used as the basis for steering the drillstring relative to the distant conductor. Possible techniques for providing current flow in the drillstring include imposing a voltage across an insulated gap or using a toroid around the drillstring to induce the current flow.

A tool for detecting nearby conductors can take the form of a drill collar in a drillstring. The tool employs the drillstring as a transmitting antenna to inject electric currents into the formation. An array of magnetic dipole antennas mounted on the collar operate to receive the magnetic fields generated by the currents in the nearby conductors. To cancel direct coupling from the source and increase sensitivity to conductive anomalies in the formation, the receiving coil antennas can be shaped symmetrically with respect to the Z-axis.

The disclosed systems and methods are best understood in a suitable usage context. Accordingly, FIG. 1 shows an illustrative geosteering environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formations.

The drill bit 14 is just one piece of a bottom-hole assembly that includes one or more drill collars (thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (a.k.a. rotational or azimuthal orientation), an inclination angle (the slope), and a compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. In some embodiments, the tool face and hole inclination angles are calculated from the accelerometer sensor output. The magnetometer sensor outputs are used to calculate the compass direction.

The bottom-hole assembly further includes a ranging tool 26 to induce a current in nearby conductors such as pipes, casing strings, and conductive formations and to collect measurements of the resulting field to determine distance and direction. Using these measurements in combination with the tool orientation measurements, the driller can, for example, steer the drill bit 14 along a desired path 18 relative to the existing well 19 in formation 46 using any one of various suitable directional drilling systems, including steering vanes, a "bent sub", and a rotary steerable system. For precision steering, the steering vanes may be the most desirable steering mechanism. The steering mechanism can be alternatively controlled downhole, with a downhole controller programmed to follow the existing borehole 19 at a predetermined distance 48 and position (e.g., directly above or below the existing borehole).

A pump 20 circulates drilling fluid through a feed pipe 22 to top drive 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity. Moreover, a telemetry sub 28 coupled to the downhole tools 26 can transmit telemetry data to the surface via mud pulse telemetry. A transmitter in the telemetry sub 28 modulates a resistance to drilling fluid flow to generate pressure pulses that propagate along the fluid stream at the speed of sound to the surface. One or more pressure transducers 30, 32 convert the pressure signal into electrical signal(s) for a signal digitizer 34. Note that other forms of telemetry exist and may be used to communicate signals from downhole to the digitizer. Such telemetry may employ acoustic telemetry, electromagnetic telemetry, or telemetry via wired drillpipe.

The digitizer 34 supplies a digital form of the telemetry signals via a communications link 36 to a computer 38 or some other form of a data processing device. Computer 38 operates in accordance with software (which may be stored on information storage media 40) and user input via an input device 42 to process and decode the received signals. The resulting telemetry data may be further analyzed and processed by computer 38 to generate a display of useful information on a computer monitor 44 or some other form of a display device. For example, a driller could employ this system to obtain and monitor drilling parameters, formation properties, and the path of the borehole relative to the existing borehole 19 and any detected formation boundaries. A downlink channel can then be used to transmit steering commands from the surface to the bottom-hole assembly.

Figure 2:
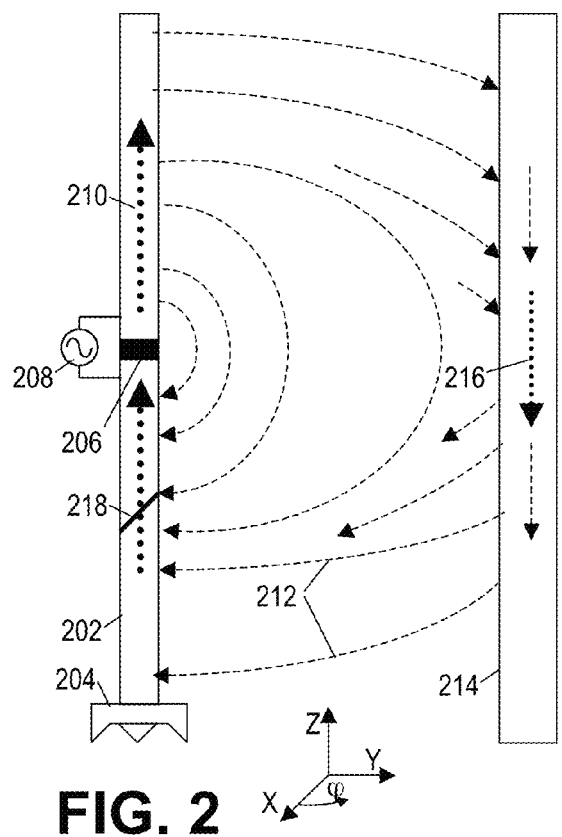
FIG. 2 shows an illustrative arrangement for passive ranging.

The principles of operation will now be briefly described with respect to FIG. 2. In a drillstring 202 having a drillbit 204, there is provided an insulating gap 206. A power source 208 applies a voltage signal across the insulator 206, causing a primary electric current 210 to propagate along the drill string 202 and through the surrounding formations to close the current loop around the insulating gap. The current flow through the formation is represented in FIG. 2 by dashed lines 212. Where such formation currents encounter a conductive object such as a low resistivity formation or a well casing 214, they will preferentially follow the low resistance path as a secondary current 216.

The secondary current 216 generates a magnetic field that should be detectable quite some distance away. At least one receiver antenna coil 218 is mounted on the drillstring 202 to detect this field. In FIG. 2, the magnetic field will be mostly in the x-direction, so the receiver antenna should have at least some sensitivity to transverse fields. The illustrated antenna coil 218 is tilted at about 45° to make it sensitive to transverse fields as the drill string rotates. That is, the secondary current induces magnetic field lines perpendicular to the current flow, and a receiver coil antenna having a normal vector component along the magnetic field lines will readily detect the secondary current flow.

Because the magnetic field produced by the primary current 210 on the mandrel is symmetrical around z-axis (in FIG. 2) and polarized in φ-direction, and the magnetic field generated by the secondary current 216 is polarized in x-direction at the receiver antenna 218, direct coupling from the source can be readily eliminated (and the signal from the conductive casing or boundary enhanced) by properly configuring and orienting the tilted coil receiver antenna. If pairs of multi-component receiver antennas as shown in FIG. 9 are employed, elimination of the direct coupling is readily accomplishable by, e.g., a weighted sum of the received signals.

Figure 3:
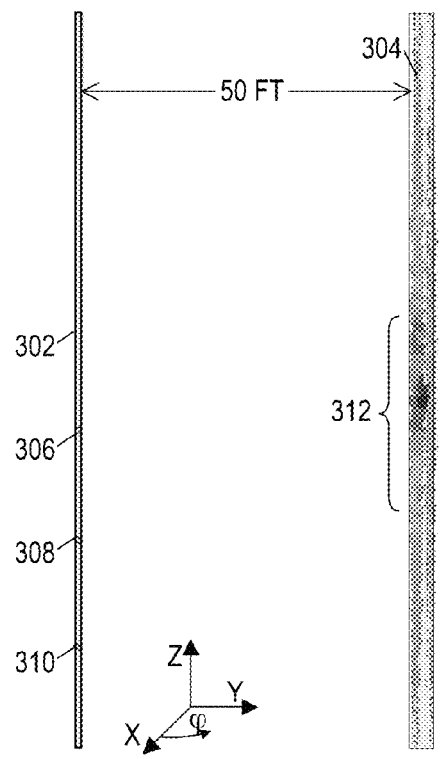
FIG. 3 shows results of a simulation.

To verify that the above-described operating principles will function as expected, the configuration shown in FIG. 3 has been modeled. In a homogeneous formation, a mandrel (i.e., a bottom hole assembly for a drillstring) 302 and a metal casing 304 are set up in parallel, spaced 50 ft apart. The mandrel 302 has a 6 inch insulated gap 306 located at 90 feet from the drilling bit, and a 1V voltage source is applied across the gap. Two tilted coil antennas 308, 310 are mounted on the mandrel 302 between the gap 306 and the drill bit, and their distances from the gap are 10 ft and 20 ft, respectively. The formation resistivity is 1 Ohm-m. FIG. 3 uses shading to indicate the density of secondary current flow induced in the target casing 304, verifying that indeed, longitudinal current flows are induced. In the model, the secondary current flows are strongest in region 312 of the casing (which is the region nearest the gap 306) and they gradually fade outside this region.

FIG. 4 is a graph of the receive signal voltages induced in the tilted coil antennas 308, 310 as the mandrel 302 rotates from 0 to 180 degrees (at zero degrees, the coil antennas are oriented similarly to coil antenna 218 of FIG. 2, i.e., 45° from the z-axis in the direction of the negative y-axis). The curves in FIG. 4 show a sinusoidal-like dependence on the rotation angle of the receiving antennas, which enables the direction to the casing to be determined. FIG. 5 is a graph of the receive signal strength (peak-to-peak) versus the casing distance. The smaller the distance, the larger the signal strength. This characteristic offers a way to determine casing distance.

In comparison to the existing tools, this passive ranging tool design is able to detect much deeper in the formation. The modeling data demonstrate clear signals from the casing when the casing is up to 150 ft away.

FIGS. 6-8 illustrate various alternative tool embodiments. Each of the illustrated embodiments employ the mandrel or drilling collar as the transmitting antenna. The transmitting antenna can be driven by a toroid or a voltage across an insulted gap.

FIG. 6 shows an embodiment that employs a toroid 602 to induce current in the drillstring 202. As shown by enlarged view 604, the toroid may be set in a recess around the mandrel for protection. A nonconductive filler material may be used to fill the remainder of the recess to seal and protect the toroid. The embodiment of FIG. 6 further includes three tilted coil receiver antennas 218, 220, and 222. The illustrated coils are parallel to each other, but could alternatively be oriented in different azimuthal directions at a tilt angle of 45° relative to the tool axis to make the coils perpendicular to each other.

Different tilt angles, azimuthal relationships, and spacings are also contemplated for the receiver antennas. However, where the coils are not parallel or perpendicular to each other, it is expected that additional processing would be required to extract the desired magnetic field measurements.

FIG. 7 shows an embodiment that employs a voltage source 208 across an insulated gap 206 to drive a current along the drillstring 202. A number of insulated gap manufacturing methods are known and disclosed, for example in U.S. Pat. No. 5,138,313 "Electrically insulative gap sub assembly for tubular goods", and U.S. Pat. No. 6,098,727 "Electrically insulating gap subassembly for downhole electromagnetic transmission". As with the embodiment of FIG. 6, an array of tilted coil receiver antennas is employed to detect the magnetic field from secondary currents in conductive features within a range of about 150 ft or so.

FIG. 8 shows an embodiment that employs a toroid 602 or an insulated gap to drive a current along the drillstring 202. The embodiment of FIG. 8 employs multi-component coils as receiving antennas at multiple receiver stations 802, 804, 806. (Multi-component coils are coils that provide magnetic coupling measurements along at least two orthogonal axes. Such measurements can be obtained using coils that are oriented in orthogonal directions, or by using coils that provide linearly-independent measurements as the tool rotates to enable the orthogonal coupling information to be extracted.) By proper processing of the receive signals from each of the coils (e.g., inversion with a suitable forward model), the casing signals and the formation signals can be separated to obtain both the casing and the formation information simultaneously. At each of the receiver stations in FIG. 8, coils are shown oriented in the x- and y-axes. Alternatively, such multi-component antennas could be collocated or nearly collocated tilted antenna coils with different tilts and/or azimuthal orientations.

FIG. 9 is a flow diagram of an illustrative ranging method. Beginning in block 902, a logging while drilling tool excites a current flow along the drill string in the borehole. As previously explained, the current disperses from the drillstring into the formation and, upon encountering a conductive feature such as a well casing or other pipe, causes a secondary current to flow. In block 904 the tool makes azimuthal magnetic field measurements with one or more receiver antennas. The receiver antennas may be rotating with the tool as these measurements are acquired, but this is not a requirement.

In block 906, the received signals are analyzed for evidence of a secondary current. To detect the magnetic field of a secondary current, it is desirable to filter out other fields such as, e.g., the earth's magnetic field, which can be readily accomplished by ensuring that the frequency of the primary current is not equal to zero (DC). Suitable frequencies range from about 1 Hz to about 500 kHz. A rotational position sensor should also be employed to extract signals that demonstrate the expected azimuthal dependence of FIG. 4. If a secondary current signal is detected, then in block 908 the tool or a surface processing system analyzes the signals to extract direction and distance information. A forward model for the tool response can be used as part of an iterative inversion process to find the direction, distance, and formation parameters that provide a match for the received signals.

It is expected that the disclosed tool design will eliminate direct coupling from the transmitter, thereby improving measurement signal to noise ratio and making the secondary current signal readily separable from signals produced by the surrounding formation. As a consequence, it is expected that even distant well casings (greater than 150 ft) will be detectable.

Various alternative embodiments exist for exploiting the disclosed techniques. Some drillstrings may employ multiple toroids to produce primary currents from multiple points on the drillstring. These primary currents may be distinguishable through the use of time, frequency, or code multiplexing techniques. Such configurations may make it easier to discern the geometry or path of the remote well.

It is expected that the system range and performance can be extended with the use of multiple receiver stations and/or multiple transmit stations. In many situations, it may not be necessary to perform explicit distance and direction calculations. For example, the measured magnetic field values may be converted to pixel colors or intensities and displayed as a function of borehole azimuth and distance along the borehole axis. Assuming the reference borehole is within detection range, the reference borehole will appear as a bright (or, if preferred, a dark) band in the image. The color or brightness of the band indicates the distance to the reference borehole, and the position of the band indicates the direction to the reference borehole. Thus, by viewing such an image, a driller can determine in a very intuitive manner whether the new borehole is drifting from the desired course and he or she can quickly initiate corrective action. For example, if the band becomes dimmer, the driller can steer towards the reference borehole. Conversely, if the band increases in brightness, the driller can steer away from the reference borehole. If the band deviates from its desired position directly above or below the existing borehole, the driller can steer laterally to re-establish the desired directional relationship between the boreholes.

Numerous other variations and modifications will become apparent to those skilled in the art once the above disclosure is fully appreciated. It is intended that the following claims be interpreted to embrace all such variations and modifications.

What is claimed is:

1. A method for detecting a conductive feature such as a pipe, a remote well, or a conductive formation, the method comprising:

providing current flow along a conductive tubular in a borehole, said current flow dispersing into a surrounding formation and causing a secondary current flow in the conductive feature, said providing including employing at least two toroids around the conductive tubular to induce the current flow; and detecting a magnetic field from the secondary current flow with at least one azimuthally-sensitive antenna in the borehole.

2. The method of claim 1, further comprising obtaining magnetic field measurements at multiple azimuths from the borehole and, based at least in part on said measurements, determining a direction of the conductive feature from the borehole.

3. The method of claim 2, wherein said obtaining includes making said measurements with antennas having different azimuthal sensitivities.

4. The method of claim 2, wherein said obtaining includes rotating said at least one antenna to make said measurements.

5. The method of claim 2, further comprising adjusting a drilling direction based at least in part on said direction.

6. The method of claim 2, further comprising estimating a distance to the conductive feature from the borehole.

7. The method of claim 1, wherein said current flow is an alternating current.

8. The method of claim 1, wherein the conductive feature is an existing well.

9. A system for detecting a conductive feature such as a pipe, a remote well, or a conductive formation, the system comprising:

a tool that induces a current flow along a drillstring in a borehole so as to cause a secondary current flow in the conductive feature, the tool including at least two toroids around the drillstring to induce the current flow; and at least one azimuthally-sensitive antenna that detects a magnetic field from the secondary current flow.

10. The system of claim 9, wherein the tool obtains magnetic field measurements at multiple azimuths from the borehole, and wherein the system further comprises a processor that determines a direction of the conductive feature from the borehole based at least in part on said measurements.

11. The system of claim 10, wherein tool obtains said measurements with antennas having different azimuthal sensitivities.

12. The system of claim 10, wherein said at least one antenna rotates to make said measurements.

13. The system of claim 10, further comprising a steering mechanism that adjusts a drilling direction based at least in part on said direction.

14. The system of claim 10, wherein the processor further determines a distance to the conductive feature from the borehole.

15. The system of claim 9, wherein said current flow is an alternating current.

16. The system of claim 9, wherein the conductive feature is an existing well.

17. The method of claim 1, further comprising time multiplexing or code multiplexing primary currents induced by each of the at least two toroids, said current flow comprising the primary currents.

18. The system of claim 8, wherein the current flow comprise a plurality of time multiplexed or code multiplexed primary currents, each primary current induced by one of the at least two toroids.

* * * * *